Patented Apr. 25, 1939

2,155,405

UNITED STATES PATENT OFFICE 2,155,405

ELECTRICAL CONDUCTOR

Donald K. Crampton, Marion, and Henry L. Burghoff, Waterbury, Conn., assignors to Chase Brass & Copper Co. Incorporated, Waterbury, Conn., a corporation No Drawing. Application April 28, 1938, Serial No. 204,912

8 Claims. (Cl. 173—13)

This invention relates to improvements in electrical conductors formed of copper-base alloys.

It is an object of this invention to produce electrical conductors formed of copper-base alloys and having a combination of high electrical conductivity and high tensile strength.

We have found that various forms of electrical conductors, such, for example, as conductor-wires of various types, welding electrode tips, electrical connections, etc., when formed of the copper-base alloys hereinafter set forth, and heat-treated, possess a combination of high electrical conductivity and high tensile strength.

The expression, combination of high electrical conductivity and high tensile strength, does not necessarily mean that each is particularly high, considered alone, but that the combination of these properties is attractive or high from a practical standpoint. In other words, the conductivity is high for a given tensile strength, or vice versa.

We have found that electrical conductors can be given a combination of high electrical conductivity and high tensile strength when made of copper-base alloys containing by weight, nickel from about 0.25% to about 3%, phosphorus from about 0.05% to about 0.6%, the ratio by weight of the nickel to phosphorus being from about 3.5 to 1 to about 7 to 1 and preferably being about 5 to 1, and copper, the copper, nickel and phosphorus constituting about 93% or more of the alloy, with or without one or more additional elements in such substantially-innocuous amounts as do not seriously impair the desired properties of the alloy.

The additional elements may range up to a total of about 7%, depending on what elements are added, some being more innocuous than others. Thus, while each of the elements aluminum, silicon and manganese should not be present much in excess of about 0.1%, and chromium should not be present much in excess of about 0.2%, silver, which is comparatively innocuous, may be present to as high as about 5%. Other elements may also be present. Thus, for example, elements which improve the machinability with very little effect on conductivity and strength, may be added, such as lead about 2%, tellurium about 1.5%, selenium about 1.5%, sulphur about 1%. In absence of silver, the total of all the said additional elements may be as high as about 2½%. With silver, the total may be as high as about 7%.

A more preferred range for the alloy is for the nickel to be from about 0.5% to about 2.5% and the phosphorus from about 0.08% to about 0.4%, with the ratio of nickel to phosphorus the same as given for the first stated alloy, and the facts concerning additional elements being the same as in the case of the first stated alloy.

A still more preferred range for the alloy is for the nickel to be from about 0.5% to about 2.5% and the phosphorus from about 0.15% to about 0.4%, with the ratio of nickel to phosphorus the same as given for the first stated alloy, and the facts concerning additional elements being the same as in the case of the first stated alloy.

Three preferred conductors may be advantageously made from specific alloys having nominal or approximate composition as follows:

The first specific alloy having about 1% nickel, about 0.2% phosphorus and the balance substantially of copper, when made in the form of a wire and finished by suitable annealing at about 1350 degrees F., then quenched and given a second heating or annealing at about 800 degrees F., and after cooling, drawn cold eight B & S numbers hard (a reduction of area of about 84%), has an electrical conductivity of 57% I. A. C. S. and a tensile strength of 104,000 lbs. per square inch; the second alloy having about 1.5% nickel, about 0.3% phosphorus and the balance substantially of copper, when similarly heat-treated and cold-drawn, has an electrical conductivity of 53% I. A. C. S. and a tensile strength of 108,000 lbs. per square inch; and the third alloy having about 0.5% nickel, about 0.1% phosphorus and the balance substantially of copper, when similarly heat-treated and cold-drawn, has an electrical conductivity of 67% I. A. C. S. and a tensile strength of 80,000 lbs. per square inch.

The nature of the effects produced by the various heat treatments and cold working may be illustrated, for example, in the case of the first specific alloy given above, in which a wire made therefrom, when annealed at 1350 degrees F. and quenched, has an electrical conductivity of 38% I. A. C. S. and a tensile strength of 39,000 lbs. per square inch, then after the second annealing at 800 degrees F. and cooling, it has an electrical conductivity of 59% I. A. C. S. and a tensile strength of 58,000 lbs. per square inch, and after the cold drawing of eight B & S numbers hard, it has an electrical conductivity of 57% I. A. C. S. and a tensile strength of 104,000 lbs. per square inch.

In general, conductors made in accordance with the present invention are heated or annealed at some high temperature in the range from 1200° F. to 1600° F. with a subsequent quench followed by a reheating or second annealing treatment at a lower temperature in the range from 500° F. to 1000° F. The low-temperature treatment results in improved strength and conductivity.

An alternative treatment is to cool slowly from the 1200° F. to 1600° F. annealing temperature, which would also result in increased strength and conductivity.

We have also found that increased tensile strength is added to that obtained by heat treatment, by cold working the conductor either between the 1200° F. to 1600° F. annealing and quenching treatment and the subsequent 500° F. to 1000° F. heat treatment, or after the entire heat treatment. The amount of cold working may be greater or less than that used for the wires made of the three specific alloys hereinbefore given.

Alloys made in accordance with the present invention can be readily cast by the usual casting practice to produce sound, tough and ductile castings.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. An electrical conductor characterized by a combination of high electrical conductivity and high tensile strength and formed of a copper-base alloy and treated to give the said combination of high electrical conductivity and high tensile strength, and containing: nickel from about 0.25% to about 3%; phosphorus from about 0.05% to about 0.6% and the ratio of the nickel to phosphorus being from about 3.5 to 1 to about 7 to 1; and copper; the said copper, nickel and phosphorus constituting 93% or more of the alloy.

2. An electrical conductor characterized by a combination of high electrical conductivity and high tensile strength and formed of a copper-base alloy and treated to give the said combination of high electrical conductivity and high tensile strength, and containing: nickel from about 0.5% to about 2.5%; phosphorus from about 0.08% to about 0.4% and the ratio of the nickel to phosphorus being from about 3.5 to 1 to about 7 to 1; and copper; the said copper, nickel and phosphorus constituting 93% or more of the alloy.

3. An electrical conductor characterized by a combination of high electrical conductivity and high tensile strength and formed of a copper-base alloy and treated to give the said combination of high electrical conductivity and high tensile strength, and containing: nickel from about 0.5% to about 2.5%; phosphorus from about 0.15% to about 0.4% and the ratio of the nickel to phosphorus being from about 3.5 to 1 to about 7 to 1; and copper; the said copper, nickel and phosphorus constituting 93% or more of the alloy.

4. An electrical conductor characterized by a combination of high electrical conductivity and high tensile strength and formed of a copper-base alloy and treated to give the said combination of high electrical conductivity and high tensile strength, and containing: nickel from about 0.25% to about 3%; phosphorus from about 0.05% to about 0.6% and the ratio of the nickel to phosphorus being about 5 to 1; and copper; the said copper, nickel and phosphorus constituting substantially all of the alloy.

5. An electrical conductor characterized by a combination of high electrical conductivity and high tensile strength and formed of a copper-base alloy and treated to give the said combination of high electrical conductivity and high tensile strength, and containing: nickel from about 0.5% to about 2.5%; phosphorus from about 0.15% to about 0.4% and the ratio of the nickel to phosphorus being about 5 to 1; and copper; the said copper, nickel and phosphorus constituting substantially all of the alloy.

6. An electrical conductor characterized by a combination of high electrical conductivity and high tensile strength and formed of a copper-base alloy and treated to give the said combination of high electrical conductivity and high tensile strength, and containing: nickel about 1%; phosphorus about 0.2%; and copper; the said copper, nickel and phosphorus constituting substantially all of the alloy.

7. An electrical conductor characterized by a combination of high electrical conductivity and high tensile strength and formed of a copper-base alloy and treated to give the said combination of high electrical conductivity and high tensile strength, and containing: nickel about 1.5%; phosphorus about 0.3%; and copper; the said copper, nickel and phosphorus constituting substantially all of the alloy.

8. An electrical conductor characterized by a combination of high electrical conductivity and high tensile strength and formed of a copper-base alloy and treated to give the said combination of high electrical conductivity and high tensile strength, and containing: nickel about 0.5%; phosphorus about 0.1%; and copper; the said copper, nickel and phosphorus constituting substantially all of the alloy.

DONALD K. CRAMPTON.
HENRY L. BURGHOFF.